Figure 1:
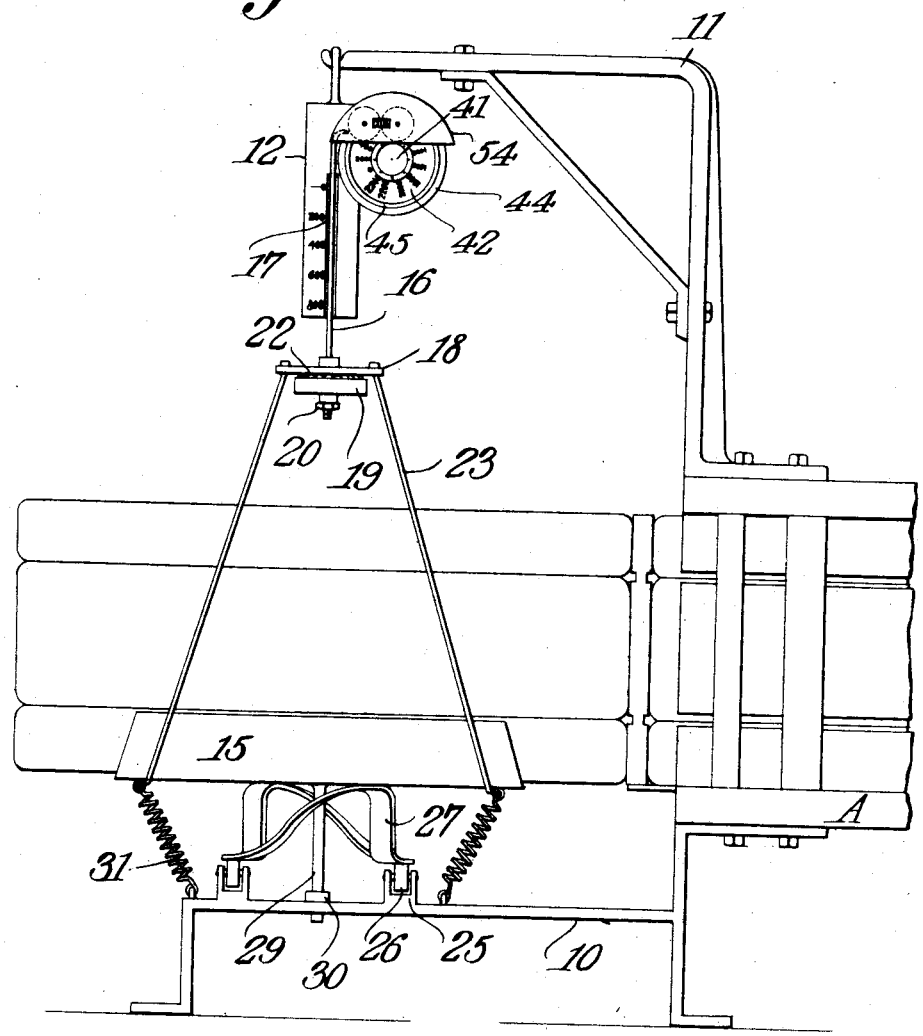

No. 872,119. PATENTED NOV. 26, 1907.
O. L. GORDON.
SCALE.
APPLICATION FILED SEPT. 17, 1906.

2 SHEETS—SHEET 1.

WITNESSES:

Orin L. Gordon INVENTOR

By C. A. Snow & Co.

ATTORNEYS

No. 872,119.  
PATENTED NOV. 26, 1907.
O. L. GORDON.
SCALE.
APPLICATION FILED SEPT. 17, 1906.
2 SHEETS—SHEET 2.
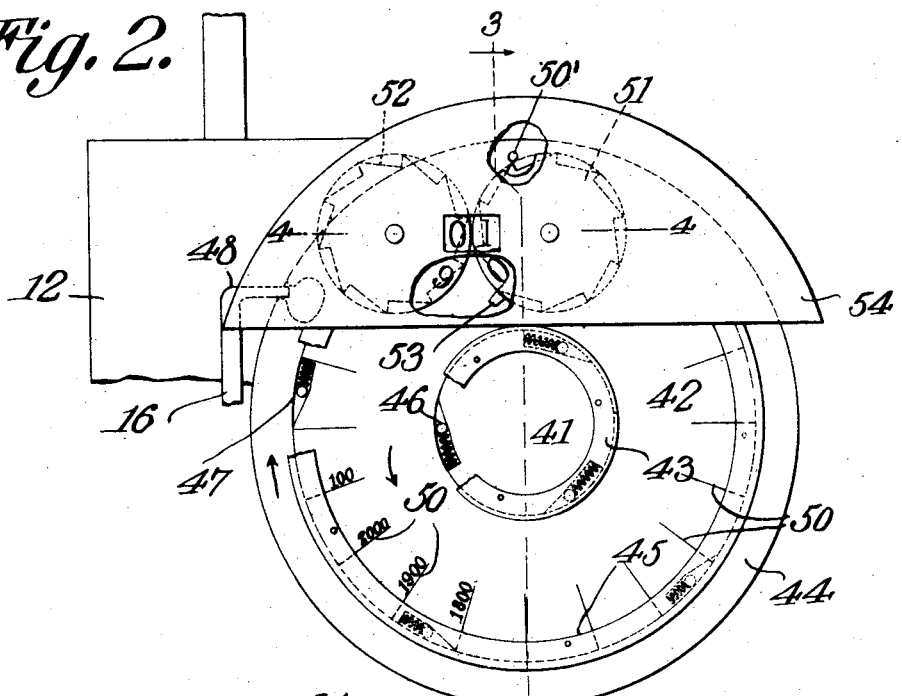
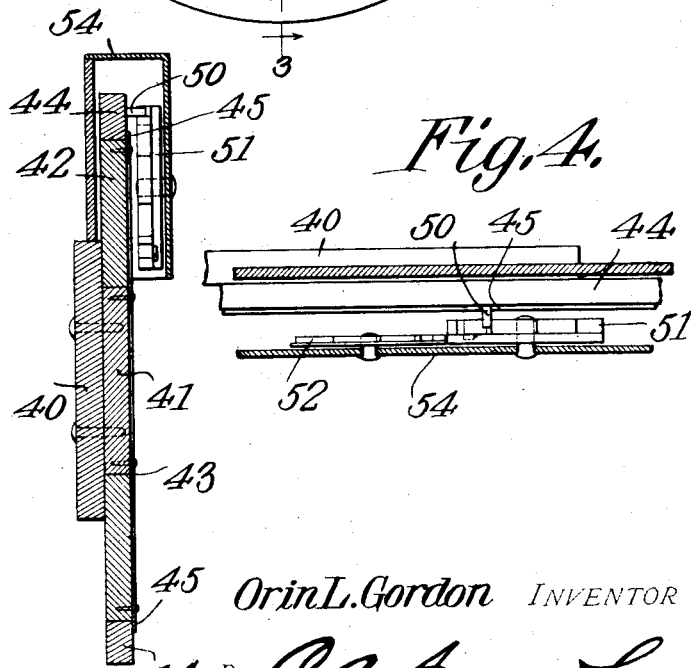
WITNESSES:
Orin L. Gordon  INVENTOR
By C. A. Snow & Co.
ATTORNEYS

UNITED STATES PATENT OFFICE.

ORIN L. GORDON, OF ROBINSON, ILLINOIS.

SCALE.

No. 872,119.      Specification of Letters Patent.      Patented Nov. 26, 1907.

Application filed September 17, 1906. Serial No. 334,917.

*To all whom it may concern:*

Be it known that I, ORIN L. GORDON, a citizen of the United States, residing at Robinson, in the county of Crawford and State of Illinois, have invented new and useful Scales, of which the following is a specification.

This invention relates to weighing scales, and has for its principal object to provide a weighing scale which will automatically register the total of all loads weighed.

A further object of the invention is to provide a device of this class which will accurately indicate the weight of different loads and at the same time will maintain a register of the gradually increasing totals of all of the loads weighed.

A still further object of the invention is to provide a novel form of scale in which the load receiving platform or scale pan is rigidly supported in position to receive the load, provision being made for permitting the platform or scale pan to lower and indicate the weight of the load.

A still further object of the invention is to provide a scale in which the load receiving platform or scale pan is revolubly mounted and is rigidly supported in one position and in the other position is free to descend to indicate the weight.

A still further object of the invention is to provide a scale that is especially adapted to receive successive loads from any suitable machine, such, for instance as a baling press, and properly support the same during the time the load is being discharged from the press, the scale being movable to complete the discharging movement and effect the weighing.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is an elevation of a weighing and registering scale constructed and arranged in accordance with the invention and illustrating the same as applied to the discharge end of a baling press. Fig. 2 is an elevation, showing principally the registering mechanism, parts being broken away in order to more clearly illustrate the construction. Fig. 3 is a vertical section of the same on the line 3—3 of Fig. 2. Fig. 4 is a sectional plan view of a portion of the registering mechanism on the line 4—4 of Fig. 2.

Similar numerals of reference are employed to indicate corresponding parts throughout the several figures of the drawings.

In the drawings, A indicates, in side elevation, the discharge end of any ordinary form of baling press, this portion of the press being supported on a suitable frame 10. The drawing shows a full bale on the weighing scale and a portion of another bale being discharged from the press, the two bales being separated by a spacing board as usual. Secured to the top of the baling press is a bracket 11 of any suitable construction, said bracket serving as a support for an ordinary form of spring scale 12, the latter being provided with suitable graduations to indicate the weight of the load placed on the scale platform or pan 15.

The platform suspension rod 16 which carries the pointer or indicator 17 extends through a guiding opening at the center of a disk 18, and also passes through a small circular block 19, the latter being held in elevated position by a locking nut 20 that extends around the rod 16. This block 19 is provided with a groove for the reception of bearing balls 22, and these balls sustain the weight of the disk 18, so that the latter may freely revolve with the suspension rod 16 as a center. The disk 18 and the scale pan or platform 15 are connected by carrying rods 23, and said scale pan is normally placed in such position as to receive the successive bales as they are discharged from the press.

In order to maintain the platform or scale pan in its elevated position while receiving a bale being discharged, the frame 10 is provided with a number of brackets 25 for the reception of the pintles of antifriction rollers 26, and on these rollers rest cam tracks 27 that are secured directly to the bottom of the platform or scale pan. When in the position illustrated in Fig. 1, the platform or scale pan will be maintained rigidly in elevated position, and is not allowed to descend for the purpose of indicating the weight until the platform or scale pan has been turned to the extent of about ninety degrees, and when this occurs, the approximately vertical portions of the cam tracks will pass beyond the rollers 26, and the platform or scale pan is then free to descend and indicate the weight of the load on the spring scale 12. In order to guide the scale pan during this turning movement, said pan is provided with a depending rod 29 that passes through an opening formed in a boss 30 in the frame 10, the rod 29 being disposed in vertical alinement with the suspension rod 16. Extending between the scale pan and the frame 10 are springs 31 which are placed under stress when the platform is turned at right angles to the position shown in Fig. 1, and as soon as the bale or other load is removed from the pan and the latter is released, the springs will return the empty platform or pan to the load receiving position shown in Fig. 1 in readiness to receive the next bale.

The mechanism thus far described can be successfully used in the weighing of bales of hay as discharged from the press, and will correctly indicate the weight of the individual bales, but in order to determine the total weight without the necessity of mentally adding the weights of the different bales, provision is made for registering the successive totals, and indicating automatically the number of tons of hay which pass through the press, it being understood, of course, that the apparatus may be used for the purpose of weighing articles other than bales of hay, and that a record may be kept of tons or any other units of weight or measure.

Extending from the frame of the scale 12 is an arm 40 to which is rigidly secured a disk 41. This disk is arranged within a second disk or ring 42 which is held from lateral play by a small ring or rings 43, as indicated in Figs. 2 and 3. This second ring is further surrounded by an annulus 44 which is held from displacement by a small flanged ring 45.

Between the inner disk 41 and the intermediate disk or ring 42 are arranged lock pawls 46 which will permit free movement of the second disk 42 only in the direction indicated by the arrow. Any tendency of movement in the opposite direction will be checked by the engagement of the locking pawls with the stationary central disk. Between the disk or ring 42 and the annulus 44 are locking pawls 47 which will permit free movement of the annulus 44 only in the direction indicated by the arrow. Where there is any tendency of movement in the opposite direction the pawls 47 will lock with the disk or ring 42 and will carry the latter with it. The outer annulus 44 is provided with an opening for the reception of an arm 48 that projects laterally from the platform suspension rod 16, and each time the load receiving platform or scale pan descends, the annulus 44 will be revolved through an arc proportioned to the weight of the load and will be moved in a direction opposite to that indicated by the arrow. This will cause movement of the intermediate disk or ring 42 in the direction indicated by its arrow through the locking of the pawls 47, and as the disk 42 is provided with graduations 50 the approximate weight of the load will be registered.

The graduations 50' are intended to indicate a sum total of one ton, or a greater or less amount as the case may be, and said disk or ring 42 carries a pin 50 for operating total disks 51 and 52, on which the total number of revolutions of the disk 42, and thus the total number of tons may be indicated.

The two totaling disks 51 and 52 are of the ratchet type, the primary disk being actuated by the pin 50' and the second disk by the transfer finger 53. Each disk carries a cipher and nine digits, and each has ten ratchet teeth. These two disks are supported by an overhanging casing 54 that is carried by the arm 40, this casing serving both as a support and a protective casing for the disks.

I claim:—

1. The combination with a scale, of a load receiver arranged for revoluble movement from load receiving to weighing position, cams for rigidly supporting the receiver in elevated load receiving position and arranged to permit descent of the load receiver when moved to weighing position, and means for turning the receiver to restore the same to elevated load receiving position after the removal of the load.

2. The combination with a scale, of a movable load receiver, a cam track carried by the load receiver, anti-friction rollers engaging the cam track and serving to support the load receiver during the reception of the load, said load receiver being revoluble to disengage the cam track from the rollers and permit descent of the load receiver during the weighing movement.

3. The combination with a weighing scale having a movable member, of a graduated disk free to rotate in but one direction, an annulus surrounding said disk, interlocking pawls between the disk and the annulus to permit independent movement of the latter in but one direction, and means for connecting the annulus to the movable member of the scale.

4. The combination with a weighing scale having a movable member, of a stationary disk, a graduated disk or ring supported thereby, a ratchet mechanism between the two disks, an annulus surrounding the graduated disk or ring, a ratchet mechanism between the annulus and said graduated disk, and means for connecting the annulus to the movable member of the scale.

5. The combination with a weighing scale having a movable member, of a stationary disk, a graduated disk or ring surrounding the same, ratchet mechanism for permitting movement of the graduated disk in but one direction, an annulus surrounding the graduated disk, ratchet mechanism for permitting independent movement of the annulus in but one direction, and an arm extending from said movable member and connected to said annulus.

6. The combination with a weighing scale having a movable member, of a stationary disk, a graduated disk or ring surrounding the same, a ratchet mechanism between the two disks, and serving to permit movement of the graduated disk in but one direction, an annulus surrounding the graduated disk, a ratchet mechanism disposed between the graduated disk and the annulus and permitting movement of the latter in but one direction, an arm extending from the movable member of the scale and connected to the annulus, a pair of totaling disks, a pin or lug on the graduated disk arranged to engage the primary totaling disk, there being a transfer device between the two totaling disks, and a support for said totaling disks.

In testimony that I claim the foregoing as my own, I have hereto affixed my signature in the presence of two witnesses.

ORIN L. GORDON.

Witnesses:
ETHELBERT CALLAHAN,
AUSBY L. LOWE.